United States Patent [19]
Sartorio et al.

[11] Patent Number: 6,036,984
[45] Date of Patent: *Mar. 14, 2000

[54] COMPLETE, NUTRITIONALLY BALANCED COFFEE DRINK

[75] Inventors: Claude Sartorio, Lake Bluff, Ill.; Paul Lin, Fullerton, Calif.; Joseph Burri, Epalinges; Olaf Wehrspann, Orbe, both of Switzerland; Shen-Youn Chang, Wadsworth, Ill.

[73] Assignee: Nestec Ltd., Vevey, Switzerland

[*] Notice: This patent is subject to a terminal disclaimer.

[21] Appl. No.: 09/203,466

[22] Filed: Dec. 2, 1998

Related U.S. Application Data

[63] Continuation-in-part of application No. 08/456,559, Jun. 1, 1995.

[51] Int. Cl.⁷ ...................................................... A23F 5/36
[52] U.S. Cl. .............................. 426/72; 426/74; 426/453; 426/455; 426/588; 426/591; 426/594; 426/595; 426/658; 426/800; 426/810
[58] Field of Search .................................... 426/594, 453, 426/455, 588, 591, 595, 658, 800, 810, 74, 72

[56] References Cited

U.S. PATENT DOCUMENTS

| | | | |
|---|---|---|---|
| 1,026,971 | 5/1912 | Bullard | 426/594 |
| 2,538,202 | 1/1951 | Kimball . | |
| 3,185,574 | 5/1965 | Gabby et al. . | |
| 3,458,319 | 7/1969 | Block et al. . | |
| 3,706,572 | 12/1972 | Einstman et al. | 426/594 |
| 3,882,253 | 5/1975 | Schafer et al. . | |
| 4,746,527 | 5/1988 | Kuypers | 426/594 |
| 4,900,566 | 2/1990 | Howard . | |
| 5,242,697 | 9/1993 | Luća . | |
| 5,292,723 | 3/1994 | Audry et al. | 426/810 |
| 5,403,826 | 4/1995 | Cope et al. . | |
| 5,433,962 | 7/1995 | Stipp . | |
| 5,620,733 | 4/1997 | Chaveron et al. | 426/594 |
| 5,641,531 | 6/1997 | Liebrecht | 426/583 |
| 5,904,948 | 5/1999 | Sartorio et al. | 426/810 |

FOREIGN PATENT DOCUMENTS

| | | |
|---|---|---|
| 0 052 919 | 6/1982 | European Pat. Off. . |
| 0 154 192 | 9/1985 | European Pat. Off. . |
| 0 458 310 | 11/1991 | European Pat. Off. . |
| 0 679 338 | 11/1995 | European Pat. Off. . |
| 2 258 799 | 8/1975 | France . |
| 0049776 | 3/1985 | Japan ................... 426/800 |
| 60-49776 | 3/1985 | Japan . |
| 1100525 | 5/1986 | Japan ................... 426/800 |
| 61-100525 | 5/1986 | Japan . |
| 96/14757 | 5/1996 | WIPO . |

OTHER PUBLICATIONS

Rombauer et al. Joy of Cooking, The Bobbs–Merrill Co., In. N.Y. p. 2, 1975.
Derwent Patent Abstract #88–103895.
Watt et al., "Composition of Foods", Agriculture Handbook, No. 8, USDA, U.S. Printing Office, D.C. 20402, 1975, p. 96.
Winter, R., "A Consumer's Dictionary of Food Additives," 3rd Ed., Crown Publishers, Inc. N.Y., 1989, p. 206.

*Primary Examiner*—Helen Pratt
*Attorney, Agent, or Firm*—Hill & Simpson

[57] ABSTRACT

A complete, nutritionally balanced coffee drink providing caloric and protein nutritional support for patients, particularly elderly and long-term care patients is provided. An instant coffee composition, a method for making the instant coffee composition and coffee drink made therefrom are described. The composition and drink has a caloric distribution including from about 16% to 30% of a protein component, from about 40% to 60% of a carbohydrate component and from about 15% to 33% of a lipid component. The instant coffee composition readily dissolves in hot water to provide a beverage which looks and tastes like black coffee which may be administered to a patient in need of nutritional support.

12 Claims, 1 Drawing Sheet

COMPLETE, NUTRITIONALLY BALANCED COFFEE DRINK

CROSS-REFERENCE TO RELATED APPLICATION

This application is a Continuation-in-Part of prior application Ser. No. 08/456,559, filed Jun. 1, 1995.

BACKGROUND OF THE INVENTION

The present invention relates generally to the treatment and nutritional support of patients. More specifically, the present invention relates to providing nutrition to a patient in need of same in a variety of compositional forms.

Patients suffering from a loss of nutrients require adequate nutritional support. The lack of adequate nutritional support can result in malnutrition associated complications, such as prolonged negative nitrogen balance and depletion of somatic and visceral protein levels. Thus, the goal of nutritional support is to maintain body mass, provide nitrogen and energy in adequate amounts to support healing, meet metabolic demands characterized by the degree of stress, and support immune function.

A traditional form of nutritional support is administering whole protein liquid feedings to the patient. Whole protein feedings are offered as a dietary supplement that typically can be consumed as partial or total meal replacements in hospitals, nursing homes and by home patients. Dietary supplements are generally useful for patients who are able to eat spontaneously but, for various reasons, do not consume enough nutrients. For instance, dietary supplements are often utilized in nursing homes as well as hospitals to treat elderly patients suffering from or at risk for protein-calorie malnutrition due to illness or age.

Dietary supplements are also useful for patients who do not absorb adequate nutrition from a routine diet. For instance, individuals who have high energy needs, fluid restriction or fat malabsorption can benefit from the use of dietary supplements. For persons who have an isolated deficiency, supplements can increase the total quantity of carbohydrate, fat or protein consumed.

The use of complete oral formulas as dietary supplements for patients who are deficient in their intake of protein, carbohydrate and/or fat is frequently a temporary measure. The temporary nature of such dietary supplements often stems from the patient's resistance to continually ingest such formulas over time as opposed to the continued need for the supplements. The great majority of medical food supplements are liquids intended for consumption at room or refrigerated temperatures.

Variety with these products currently means different flavors of the same form. However, research on sensory-specific satiety shows that consumption of foods and nutritional supplements with an almost identical hedonic profile, regardless of flavor differentiation, results in a sense of satiety and boredom. As a result, a progressive drop in compliance of the use of the supplements arises. Moreover, some carry-over satiety that affects the intake of other food as well as a lower caloric intake/day arises.

Moreover, in addition to taste variety, the nutritional supplement must also contain a nutritionally complete profile of needed nutrients to provide the required nutritional support. An assortment of meal supplements and snacks exist on the market, such as many weight loss and sports supplements. However, these supplements tend to stress low fat or high protein without providing nutritional balance and completeness in the form of the full component of vitamins and minerals. Patients consuming such products fail to obtain the required nutrients needed for adequate nutritional support.

Therefore, a need exists for a complete nutritional supplement that can be offered in a variety of forms and flavors. In order to provide the same nutritional value irrespective of the form or flavor, such a nutritional supplement should preferably provide a nutritionally consistent profile irrespective of the form selected. Moreover, to increase patient compliance, the composition should be provided in a variety of tastes, forms, smells and temperatures, resulting in a family of products that are nutritionally interchangeable.

SUMMARY OF THE INVENTION

The present invention provides a reconstitutable powder coffee composition that, when reconstituted with hot water, provides a nutritionally complete, balanced coffee drink which may be used to provide caloric and protein support to a patient in need of nutritional support. The coffee composition and coffee drink prepared therefrom are especially useful as an enterally administered component in a program of nutritional care and management which utilizes a number of carefully designed nutritional products in various forms, i.e., in shake, soup, fruit drink, snack bar and coffee forms, which can be mixed and matched over a period of nutritional care to provide more attractive and, therefore, more effective nutritional support to a patient, particularly those in extended care situations.

In an embodiment, the present invention provides a coffee composition in an agglomerated, dissolvable powder comprising: coffee powder; from about 16% to about 30% of calories of a protein component; from about 40% to about 60% of calories of a carbohydrate component; and from about 15% to about 33% of calories of a lipid component.

In an embodiment, the present invention provides a method for providing nutritional support to a long term care patient. The method includes providing nutrition to a patient in need of nutritional support comprising enterally administering to the patient a balanced, nutritionally complete coffee drink in the form of an aqueous solution of coffee; from about 15% to about 30% of calories of a protein component; from about 40% to about 60% of calories of a carbohydrate component; and from about 15% to about 33% of calories of a lipid component. The coffee drink of the present invention is especially well suited to provide additional calories and protein to an elderly patient.

In an embodiment, a method for making a nutritionally balanced and complete reconstitutable powdered coffee composition is provided comprising the steps of: dry blending a protein component and a carbohydrate component, each in powder form to form a first mixture. While the first mixture is dry blended, an aqueous salt solution is sprayed thereon and agglomerated to form a second mixture. The second mixture is sprayed with atomized oil having a fine particle size and agglomerated to form a third mixture. The third mixture is dry blended with coffee powder to form a fourth mixture. The fourth mixture is sprayed while being dry blended with an aqueous carbohydrate solution and agglomerated to provide a rapidly dissolvable reconstitutable powdered coffee composition.

In yet another embodiment, the coffee composition further comprises at least $\frac{1}{2000}$ of US RDA of vitamins and minerals per calorie of the composition.

An advantage of the present invention is that it provides another form of nutritional composition that can be administered to a patient for whom nutritional support is being provided in a variety of compositional forms. Additionally, the composition of the present invention expands the inventory of nutritional forms which may be used in a nutritional support regimen to offer a patient a variety of flavors, textures, aromas, temperatures, colors, sizes and shapes.

Another advantage of the present invention is that it stimulates appetite and prevents taste fatigue by contributing to the variety of suitable nutritional forms. The stimulation of the appetite in turn encourages proper nutrition.

Yet another advantage of the present invention is that it provides a nutritional supplement in the form of a traditional coffee drink, which looks and tastes like black coffee, but which contains complete and balanced nutritional components.

Additional features and advantages of the present invention are described in, and will be apparent from, the detailed description of the presently preferred embodiments taken in conjunction with the Drawings, in which:

DETAILED DESCRIPTION OF THE PRESENTLY PREFERRED EMBODIMENTS

Figure 1:
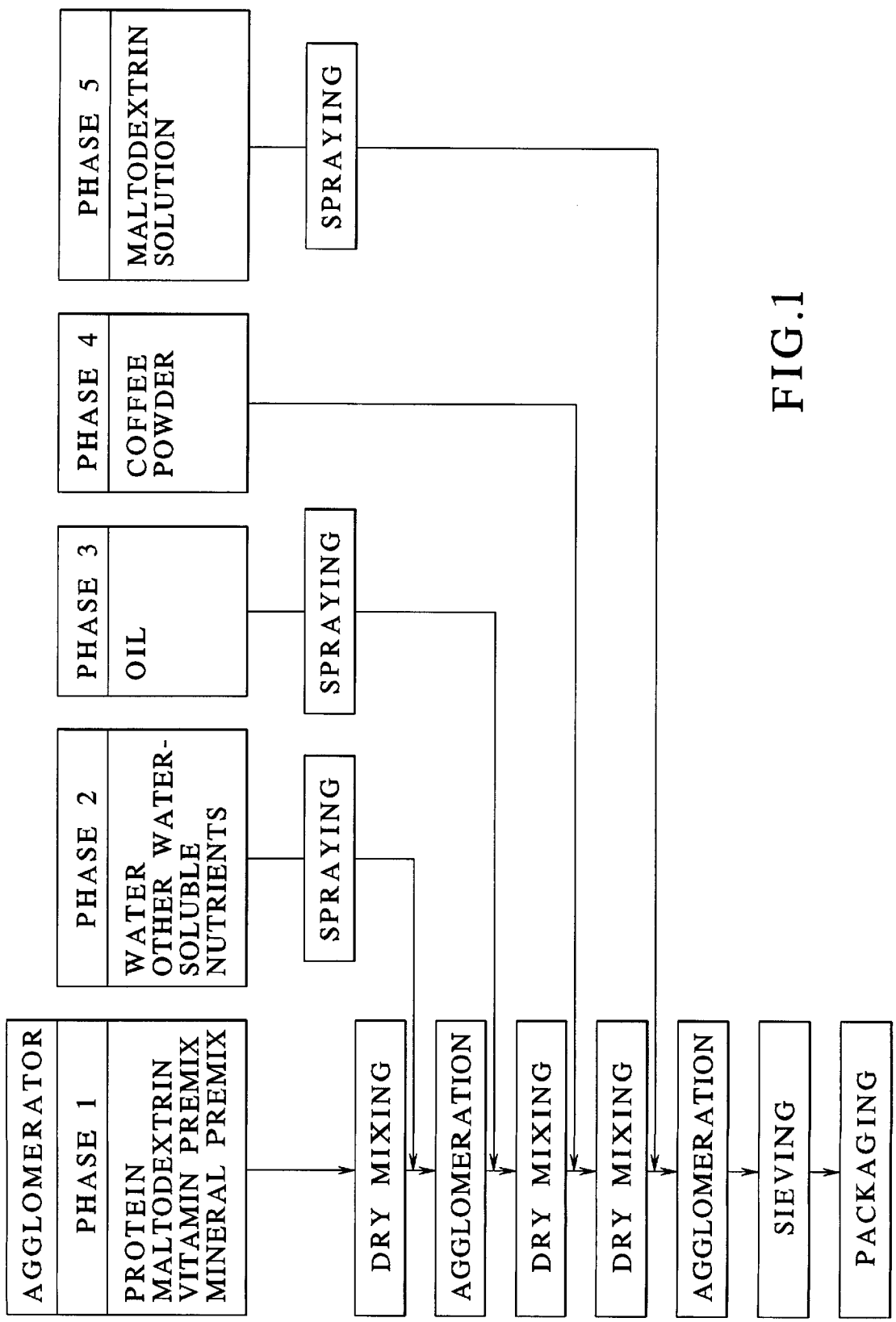
FIG. 1 is a schematic flow diagram illustrating the method for making a new and improved instant coffee composition in accordance with the invention.

Nutritional support of hospitalized as well as non-hospitalized patients requires prevention, recognition and treatment of nutritional depletion that may occur with illness. The goals of nutritional support include stabilizing metabolic state, maintaining body mass, and/or facilitating growth in the presence of disease and gastrointestinal dysfunction.

Ensuring proper nutritional support depends on obtaining and maintaining patient compliance. To this end, a never-ending market demand for oral supplements is providing taste variety. Variety stimulates the appetite of the patient and thereby prevents taste fatigue. Stimulation of the appetite in turn encourages proper nutrition. Therefore, to ensure nutritional support of hospitalized as well as non-hospitalized patients, the present invention provides a nutritional supplement that can be administered in a variety of product forms and flavors.

The present invention provides a method for providing nutrition to a long term care patient with the use of a composition that is administered in a solid, semi-solid or liquid form. Uniquely, each of these forms contains substantially equivalent nutritional profiles. The composition of each form includes a protein source, a carbohydrate source and a fat source. In an embodiment, the composition also provides at least 1/2000 of the U.S. RDA of vitamins and minerals per calorie of the composition regardless of its form.

Preferably, the protein source of the present invention provides approximately 14% to 25% of the caloric distribution of the composition. Among others, suitable sources of protein are casein, soy, whey, and pea protein. In a preferred embodiment, the protein source is caseinate. In an embodiment, the protein source comprises approximately 14% of the caloric distribution of the composition.

Carbohydrates provide approximately 40% to 75% of the caloric content of the composition. When a fat source is utilized, the carbohydrates, in an embodiment, provide approximately 40% to 53% of the caloric content of the composition. In a preferred embodiment, the carbohydrate source is approximately 53% of the caloric distribution of the composition. A number of carbohydrates can be utilized including maltodextrin, corn syrup solids and sucrose.

In addition to simple sugars, the carbohydrate source, in an embodiment, includes a source of dietary fiber. Numerous types of dietary fiber are available. Dietary fiber passes through the small intestine undigested by enzymes and represents a kind of natural and necessary laxative. Suitable sources of dietary fiber, among others, include soy, oat, and gum arabic. When added to the composition, the total fiber contained in the composition is approximately 0 to 14 g/L.

The fat source of the present invention consists of long chain triglycerides (LCT). Preferably, the fat source is approximately 0% to about 45% of the caloric content of the composition. While the composition, in an embodiment is fat-free, the composition containing fat, in another embodiment, comprises from about 30% to 45% of the caloric content of the composition. In a preferred embodiment, the fat source is approximately 33% of the caloric content of the composition.

Preferably, the fat source is a mixture of long chain triglycerides. Suitable sources of long chain triglycerides are olive oil, corn oil, canola oil, palm kernel oil, sunflower oil, peanut oil, soy lecithin and residual milk fat. The lipid profile containing such long chain triglycerides is designed to have a polyunsaturated fatty acid omega-6 (n-6) to omega-3 (n-3) ratio of approximately 3:1 to 6:1. The proposed ratio of n-6:n-3 is designed to prevent suppression of the immune system caused by excessive n-6 fatty acids. In an embodiment, the omega-6 to omega-3 ratio is approximately 4:1.

While the fat source preferably contains only long-chain triglycerides, the fat source may also contain medium chain triglycerides. In an embodiment, the fat source includes from approximately 0% to 75% from medium chain triglycerides. Such medium chain triglycerides are easily absorbed and metabolized in the patient's body. In addition to proper amounts of protein, fat and carbohydrates, most patients receiving dietary supplements have elevated requirements for certain vitamins, minerals and trace elements. To this end, the present invention also includes a suitable vitamin and mineral profile. Uniquely, irrespective of the form of the composition utilized, the composition includes, in an embodiment, at least 1/2000 of the U.S. RDA of vitamins and minerals per calorie of the composition. Thus, the various forms can be interchanged for each other without a loss of any key macronutrients or micronutrients.

In yet another embodiment, the composition of the present invention includes a source of beta-carotene. Beta-carotene meets a portion of the required vitamin A, thereby meeting micronutrient requirements in a small caloric volume. It is also an important nutrient with anti-oxidant properties. The composition preferably includes approximately 0.5 to 1.5 mg/1000 calories of beta-carotene. In a preferred embodiment, beta-carotene is present in an amount of approximately 1.0 mg/1000 calories.

By way of example, and not limitation, an example of a suitable composition that may be used pursuant to the present invention is as follows:

The composition includes the following ingredients: water; protein: caseinate; carbohydrate: maltodextrin, corn syrup solids, and sucrose; fat: canola oil, corn oil, and soy lecithin; vitamin A; beta-carotene; vitamin D; vitamin E; vitamin K; vitamin C; thiamine ($B_1$); riboflavin ($B_2$); niacin, vitamin $B_6$; folic acid; pantothenic acid; vitamin $B_{12}$; biotin;

choline; taurine; calcium; phosphorus; magnesium; zinc; iron; copper; manganese; iodine; sodium; potassium; chloride; chromium; molybdenum; and selenium.

The composition of the present invention is a ready-to-use oral supplement. The composition can be provided in a variety of product forms, including solid, semi-solid or liquid form. Suitable solid forms that may be utilized in the present invention are a bar, a cookie, a bread, and cereal. Among others, a suitable semi-solid form is pudding. Whereas, suitable liquid forms that may be used pursuant to the present invention are a shake, soup, juice and coffee drink.

In addition to providing variety in the choice of product forms, the present invention also provides nutritional supplements in a variety of flavors. Moreover, the product forms of the present invention provide variety with respect to aroma, texture, temperature, color, size and shape. Uniquely, irrespective of the form and flavor, the nutritional supplements of the present invention contain substantially equivalent nutritional profiles.

Naturally, providing the patient with a multitude of suitable nutritional supplements promotes patient compliance as well as versatility. For example, after a patient consumes a standard liquid whole protein feeding in the hospital, such patient may be given another of the suitable nutritional supplement forms (i.e. bar or soup) for use outside of the hospital to assure the patient maintains a proper diet.

The composition provided in the various product forms can be used as a supplement or for total nutritional support. The composition is a preferably lactose-free, gluten-free, low in sodium and low in cholesterol. In an embodiment, the composition has a caloric density of approximately 0.75 to 2.0 kcal/ml. The osmolality of the composition ranges from approximately 450 to 750 mOsm depending on the product form of the composition.

The composition of the present invention is non-disease specific. The composition can be utilized to provide adequate nutrition to a multitude of long-term care patients, such as patients suffering from AIDS, malabsorbing conditions, or other chronic diseases. Moreover, the present invention is suitable for providing nutrition to elderly patients suffering from or at risk for protein-calorie malnutrition due to illness or age.

By way of example, and not limitation, examples of suitable nutritional product forms and corresponding nutrient profiles that may be used pursuant to the present invention will now be given.

EXAMPLE 1
Drink

The composition of the present invention in a liquid shake form has an osmolality of approximately 500 to 540 mOsm and a caloric density of about 1.0 kcal/ml. The liquid shake can be offered in vanilla, chocolate or strawberry and provides 100% of the U.S. RDA in 2000 calories. The composition has the following nutrient profile (per 250 calories). In an embodiment, the liquid shake also includes a source of dietary fiber.

| Nutrient Composition | Amount |
| --- | --- |
| Protein | 8.75 g |
| Carbohydrate | 33.1 g |
| Fat | 9.2 g |

| Nutrient Composition | Amount |
| --- | --- |
| Cholesterol | <1 mg |
| Vitamin A | 750 IU |
| Beta-Carotene | 0.25 mg |
| Vitamin D | 52 IU |
| Vitamin E | 5.2 IU |
| Vitamin K | 9.4 mcg |
| Vitamin C | 26 mg |
| Thiamine ($B_1$) | 0.4 mg |
| Riboflavin ($B_2$) | 0.45 mg |
| Niacin | 5.2 mg |
| Vitamin $B_6$ | 0.75 mg |
| Folic Acid | 100 mcg |
| Pantothenic Acid | 2.6 mg |
| Vitamin $B_{12}$ | 1.5 mcg |
| Biotin | 75 mcg |
| Choline | 85 mg |
| Taurine | 15 mg |
| Calcium | 125 mg |
| Phosphorus | 125 mg |
| Magnesium | 50 mg |
| Zinc | 2.6 mg |
| Iron | 2.25 mg |
| Copper | 0.25 mg |
| Manganese | 0.5 mg |
| Iodine | 18.75 mcg |
| Sodium | 219 mg |
| Potassium | 312 mg |
| Chloride | 300 mg |
| Chromium | 7.5 mcg |
| Molybdenum | 22.5 mcg |
| Selenium | 7.5 mcg |

In a preferred embodiment, the protein source is caseinate. The carbohydrate source is a mixture of corn syrup solids and sucrose; whereas, the fat source is a mixture of canola oil, corn oil and lecithin. In an embodiment, the fat source includes 70% from canola oil, 24% from corn oil and 6% from lecithin, with the goal of producing an n6:n3 ratio of between approximately 4:1 to 6:1.

EXAMPLE 2
Bar

The composition of the present invention can also be offered in a solid bar form. Food bars offer excellent taste as well as variety and convenience over liquids. In an embodiment, the bar of the present invention will deliver 125 calories and half the nutritional content of the liquid form. As a result, for comparison purposes, two bars of the present invention is equivalent to 250 ml of the liquid drink form and thus may be replaced for same.

The solid bar form can be offered in a variety of flavors and provides 100% of the U.S. RDA in 2000 calories. In an embodiment, the bar form has a soft, easy-to-chew texture. The composition has the following nutrient profile (per 125 calories).

| Nutrient Composition | Amount |
| --- | --- |
| Protein | 4.4 g |
| Carbohydrate | 16.6 g |
| Fat | 4.6 g |
| Cholesterol | <1 mg |
| Vitamin A | 375 IU |
| Beta-Carotene | 0.125 mg |
| Vitamin D | 26 IU |
| Vitamin E | 2.6 IU |
| Vitamin K | 4.7 mcg |
| Vitamin C | 13 mg |

| Nutrient Composition | Amount |
| --- | --- |
| Thiamine (B$_1$) | 0.2 mg |
| Riboflavin (B$_2$) | 0.25 mg |
| Niacin | 2.6 mg |
| Vitamin B$_6$ | 0.35 mg |
| Folic Acid | 50 mcg |
| Pantothenic Acid | 1.3 mg |
| Vitamin B$_{12}$ | 0.75 mcg |
| Biotin | 37.5 mcg |
| Choline | 42.5 mg |
| Taurine | 7.5 mg |
| Calcium | 100 mg |
| Phosphorus | 100 mg |
| Magnesium | 40 mg |
| Zinc | 1.3 mg |
| Iron | 1.1 mg |
| Copper | 0.13 mg |
| Manganese | 0.25 mg |
| Iodine | 9.5 mcg |
| Sodium | 135 mg |
| Potassium | 220 mg |
| Chloride | 160 mg |
| Chromium | 4 mcg |
| Molybdenum | 11 mcg |
| Selenium | 4 mcg |

In a preferred embodiment, the protein source is caseinate, whey and soy protein. The carbohydrate source is a mixture of maltodextrin, corn syrup solids and sucrose; whereas, the fat source is a mixture of canola oil, palm kernel oil and lecithin.

EXAMPLE 3

Soup

In yet another form, the composition of the present invention can be in a soup form. In an embodiment, the composition is a powdered soup that can be mixed with hot water or mixed with cold water and heated. To add variety, the soup can be either of completely uniform texture or contain small food pieces as a means of varying taste and mouth feel.

The soup form can be offered in a variety of flavors, such as creamy tomato or chicken. Similar to the other forms, it provides 100% of the U.S. RDA in 2000 calories. The composition of the present invention in a soup form has the following nutrient composition (per 250 calories).

| Nutrient Composition | Amount |
| --- | --- |
| Protein | 8.75 g |
| Carbohydrate | 33.1 g |
| Fat | 9.2 g |
| Cholesterol | <5 mg |
| Vitamin A | 750 IU |
| Beta-Carotene | 0.25 mg |
| Vitamin D | 52 IU |
| Vitamin E | 5.2 IU |
| Vitamin K | 9.4 mcg |
| Vitamin C | 26 mg |
| Thiamine (B$_1$) | 0.4 mg |
| Riboflavin (B$_2$) | 0.45 mg |
| Niacin | 5.2 mg |
| Vitamin B$_6$ | 0.75 mg |
| Folic Acid | 100 mcg |
| Pantothenic Acid | 2.6 mg |
| Vitamin B$_{12}$ | 1.5 mcg |
| Biotin | 75 mcg |
| Choline | 85 mg |
| Taurine | 15 mg |
| Calcium | 165 mg |
| Phosphorus | 165 mg |
| Magnesium | 50 mg |
| Zinc | 2.6 mg |
| Iron | 2.25 mg |
| Copper | 0.25 mg |
| Manganese | 0.5 mg |
| Iodine | 18.75 mcg |
| Sodium | 390–660 mg |
| Potassium | 310 mg |
| Chloride | 390–660 mg |
| Chromium | 7.5 mcg |
| Molybdenum | 22.5 mcg |
| Selenium | 7.5 mcg |

EXAMPLE 4

Coffee

The composition of the present invention may also be offered as a coffee drink since long term care patients, such as elderly patients, often drink coffee, the composition of the present invention offers not only an appealing liquid supplement, it provides an effective nutritional supplement.

In an embodiment, the coffee drink is a powdered product. In a preferred embodiment, the drink has a decaffeinated coffee base to which protein, carbohydrates, vitamins/minerals and lipid are added. However, the drink may include a caffeinated coffee base. The coffee product has a caloric concentration of approximately 0.75 kcal/ml. The composition of the present invention in a liquid coffee form has the following nutrient composition (per 125 calories).

| Nutrient Composition | Amount |
| --- | --- |
| Protein | 7.8 g |
| Carbohydrate | 14.0 g |
| Fat | 4.2 g |
| Cholesterol | <1 mg |
| Vitamin A | 375 IU |
| Beta-Carotene | 0.125 mg |
| Vitamin D | 26 IU |
| Vitamin E | 2.6 IU |
| Vitamin K | 4.7 mcg |
| Vitamin C | 13 mg |
| Thiamine (B$_1$) | 0.2 mg |
| Riboflavin (B$_2$) | 0.25 mg |
| Niacin | 2.6 mg |
| Vitamin B$_6$ | 0.35 mg |
| Folic Acid | 50 mcg |
| Pantothenic Acid | 1.3 mg |
| Vitamin B$_{12}$ | 0.75 mcg |
| Biotin | 37.5 mcg |
| Choline | 42.5 mg |
| Taurine | 7.5 mg |
| Calcium | 100 mg |
| Phosphorus | 100 mg |
| Magnesium | 40 mg |
| Zinc | 1.3 mg |
| Iron | 1.1 mg |
| Copper | 0.13 mg |
| Manganese | 0.25 mg |
| Iodine | 9.5 mcg |
| Sodium | 135 mg |
| Potassium | 220 mg |
| Chloride | 160 mg |
| Chromium | 4 mcg |
| Molybdenum | 11 mcg |
| Selenium | 4 mcg |

EXAMPLE 5

Juice

The composition of the present invention can also be offered in a juice form. The juice form can be offered in characteristic "juice" flavors, colors and mouth-feel as a means of providing an alternative to the standard milk-like nutritional supplements. Preferably, the composition in a juice form is acidic and has a pH of approximately 3.8. The composition has the following nutrient profile (per 120 calories).

| Nutrient Composition | Amount |
| --- | --- |
| Protein | 7.5 g |
| Carbohydrate | 22.5 g |
| Fat | 0 g |
| Cholesterol | 0 mg |
| Vitamin A | 900 IU |
| Vitamin D | 60 IU |
| Vitamin E | 6 IU |
| Vitamin K | 18 mcg |
| Vitamin C | 80 mg |
| Thiamine ($B_1$) | 0.6 mg |
| Riboflavin ($B_2$) | 0.72 mg |
| Niacin | 7.2 mg |
| Vitamin $B_6$ | 0.84 mg |
| Folic Acid | 116 mcg |
| Pantothenic Acid | 3.0 mg |
| Vitamin $B_{12}$ | 1.8 mcg |
| Biotin | 60 mcg |
| Calcium | 50 mg |
| Phosphorus | 50 mg |
| Magnesium | 20 mg |
| Copper | 0.6 mg |
| Manganese | 1.2 mg |
| Sodium | 30 mg |
| Potassium | 100 mg |

In an embodiment, the protein source of the juice form is a mixture of whey protein hydrolysate and pea protein hydrolysate. The carbohydrate source is a mixture of maltodextrin and sucrose. No fat is incorporated into this form.

EXAMPLE 6

Reconstitutable Coffee Composition

In accordance with a preferred embodiment, the present invention provides a new and improved powdered coffee composition which when reconstituted with hot water provides a coffee drink which looks and tastes like black coffee. The coffee drink provides significant therapeutically effective amounts of high quality protein and calories in a nutritionally balanced and complete coffee beverage. The product is especially well suited for use by the elderly in general, whether in institutions or at home, who frequently are undernourished with respect to their protein and caloric intakes. The elderly frequently consume coffee but most coffee drinks have little or no nutritional value. The new and improved instant coffee composition is easy to use, tastes good and can be mixed with cream and sugar if desired.

In accordance with this embodiment, the new and improved nutritionally complete coffee drink comprises a drink powder composition comprising from about 16% to about 30% of calories of a protein component, from about 15% to about 33% of calories of a lipid component, and from about 40% to about 60% of calories of a carbohydrate component which looks and tastes like black coffee when mixed with hot water.

The protein component may comprise whey protein, milk protein, vegetable protein such as soy and pea proteins and mono-, di- and oligo-peptides. The protein component should comprise high nutritional quality proteins present in a high protein concentration of from about 78% to about 92%. The protein component should also exhibit good heat stability, good solubility in water and high clarity in aqueous solution so that the coffee color appears black. The lipid and carbohydrate components may comprise conventional ingredients and blends of ingredients for these components as described above.

The new and improved instant coffee composition is prepared by dry mixing the protein and carbohydrate components together, alone or in combination, with a vitamin premix and/or a trace elements mineral premix. A salt solution of water soluble minerals is sprayed onto the dry mix and the resulting mixture is agglomerated by further dry mixing. The oil or oils forming the lipid component are sprayed onto the mixture. Care should be taken at this stage to atomize the oil to a sufficiently small particle size so that after reconstitution with hot water no sign of a milky oil appears. Control of the particle size of the oil may generally be provided by controlling the nozzle diameter, delivery pressure and spraying time. Thereafter, instant coffee powder is added and dry mixing of the ingredients is continued. An aqueous maltodextrin solution is prepared and sprayed onto the mixture to promote rapid dissolution of the ingredients in hot water. After agglomerating by continuous dry mixing, the instant coffee composition is sieved through a sieve having a mesh size of from about 12 to 30 mesh, i.e., a sieve or screen having from 12 to 30 openings per linear inch. A preferred sieve has a #16 mesh size.

During dry mixing, temperature of the powder composition is maintained below about 70° C. More particularly, during phase one wherein the protein and carbohydrate powders and vitamin and trace element premixes are dry blended or mixed, the temperature of the powder is from about 34° C. to about 37° C. In phase two, wherein the salt solution is sprayed onto the mixture, the temperature of the powder is from about 36° C. to about 40° C. In phase three, wherein oil is sprayed onto the mixture, the temperature of the powder is from about 55° C. to about 60° C. In phase four, wherein coffee powder is added and dry blended, the temperature of the powder is from about 55° C. to about 60° C. Finally, in phase five, wherein the maltrin solution is sprayed onto the mixture, the powder temperature is from about 55° C. to about 58° C. Dry blending and agglomeration may be performed using Agglomeration Glatt Processing Method IFP methods and equipment employing hot air for controlling temperature.

More particularly, and referring now to FIG. 1, a 300 kg batch of the new and improved instant coffee composition was prepared on Glatt Agglomerator IFP equipment in accordance with the following protocol.

The following ingredients were added to the agglomerator for dry mixing:

| Phase 1 (Dry Mix) | Amount in kg |
| --- | --- |
| Maltrin M-180 | 159.467 |
| Whey Protein Isolate P5DI-23 | 79.693 |
| Calcium Carbonate | 2.373 |
| Magnesium Carbonate | 0.927 |
| Vitamin Premix VP-2072 | 0.966 |
| Trace Elements Premix, TE-509A | 0.483 |
| Total | 243.908 |

The Phase 1 ingredients were dry mixed under the following conditions:

| | |
|---|---|
| Mixing time | 2 minutes |
| Hot air temperature inlet set | 100–104° C. |
| Hot air temperature inlet | 90–100° C. |
| Temperature of the powder | 34–37° C. |

A salt solution was prepared as follows:

| Phase 2 (Salt Solution) | Amount in kg |
|---|---|
| Water, 65° C. | 35.318 |
| Potassium Citrate | 3.019 |
| Sodium Biphosphate | 1.872 |
| Choline Bitartrate | 0.453 |
| Total | 40.661 |

The potassium citrate was dissolved first and all salts were completely dissolved prior to dosing.

In Phase 2, the salt solution was sprayed onto the dry mixture under the following conditions:

| | |
|---|---|
| Position of nozzle | Middle |
| Nozzle aperture diameter | 1.8 mm |
| Nozzle pressure | 50 psi |
| Dosing pump | 75 rpm |
| Spraying time | 13 minutes |
| Hot air temperature inlet set | 105–110° C. |
| Hot air temperature inlet | 90–105° C. |
| Temperature of the powder | 36–40° C. |

After agglomeration for a few minutes, the Phase 3 lipid-components were sprayed onto the mixture:

| Phase 3 (Oil) | Amount in kg |
|---|---|
| Trisun Oil R 80 | 24.542 |

The oil was sprayed onto the mixture under the following conditions:

| | |
|---|---|
| Position of nozzle | Middle |
| Nozzle aperture diameter | 1.5–2.5 mm, preferably 1.8 mm |
| Nozzle pressure | 40 psi minimum, preferably 50 psi |
| Dosing pump | 75 RPM |
| Spraying time | 9 minutes |
| Hot air temperature inlet set | Approx. 100° C. |
| Hot air temperature inlet | 100–105° C. |
| Temperature of the powder | 50–60° C.; maximum 70° C. |

After additional mixing for a few minutes, a decaffeinated coffee powder was added as follows:

| Phase 4 (Dry Mix) | Amount in kg |
|---|---|
| Nescafe decaffeinated | 25.055 |

In Phase 4, the coffee powder was added and mixed under the following conditions:

| | |
|---|---|
| Mixing time | 1 minutes |
| Temperature of the powder | 55–60° C. |

Thereafter, an aqueous carbohydrate solution was prepared as follows:

| Phase 5 (Maltrin Solution) | Amount in kg |
|---|---|
| Water, 65° C. | 15.093 |
| Maltrin M-180 | 3.019 |
| Total | 18.112 |

In Phase 5, the maltrin solution was sprayed onto the mixture and agglomerated under the following conditions:

| | |
|---|---|
| Position of nozzle | Middle |
| Nozzle aperture diameter | 1.8 mm |
| Nozzle pressure | 50 psi |
| Dosing pump | 75 rpm |
| Spraying time | 6–8 minutes |
| Hot air temperature inlet set | 110–150° C. |
| Hot air temperature inlet | 100–110° C. |
| Temperature of the powder | 55–58° C. |

After agglomeration was complete, the product was sieved through a sieve having a mesh size of between #12–#30, preferably #16 mesh, and collected in 25 kg storage bags. The product had a bulk density of about 250 to about 290 grams per liter. The product had a tapped density of about 360 to about 400 grams per liter.

The product was stored in a 502 mm×604 mm composite cans containing about 544 grams each.

One scoop of the product or about 60 cc=17 grams. Two scoops of the instant coffee composition are equal to one serving and each serving contains about 34 grams.

Two scoops of product were reconstituted with about 6 to 8 ounces of hot water. The instant coffee powder dissolved almost instantly to provide a clear solution looking and tasting like black coffee and which contained nutritionally therapeutic amounts of calories, protein, carbohydrate and lipid.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A nutritional composition that when reconstituted with hot water provides a complete, nutritionally balanced, black coffee drink, the composition being in the form of an agglomerated, dissolvable powder comprising:
   coffee powder;
   from about 16% to about 30% of calories of a protein component exhibiting high clarity in aqueous solution for providing a black coffee drink;
   from about 40% to about 75% of calories of a carbohydrate component; and
   from about 15% to about 33% of calories of an atomized lipid component.

2. A composition as in claim 1 wherein the protein component comprises intact whey protein.

3. A composition as in claim 1 wherein the coffee powder is decaffeinated coffee.

4. A composition as in claim 1 wherein the carbohydrate component comprises maltodextrin.

5. A composition as in claim 1 further comprising vitamins and minerals.

6. A composition according to claim 1 wherein the carbohydrate component provides about 40% to about 60% of the calories of the composition.

7. A nutritional composition that when reconstituted with hot water provides a complete, nutritionally balanced, black coffee drink, the composition being in the form of an agglomerated, dissolvable powder comprising:

coffee powder;

from about 16% to about 30% of calories of a powdered protein component exhibiting high clarity in aqueous solution for providing a black coffee drink;

from about 40% to about 70% of calories of a powdered carbohydrate component;

from about 15% to about 33% of calories of an atomized lipid component, the composition being produced by a process which comprises dry blending the protein component and the carbohydrate component to form a first mixture;

spraying the first mixture while dry blending with an aqueous salt solution and agglomerating to form a second mixture;

spraying the second mixture with the lipid component, in atomized form, and agglomerating to form a third mixture;

dry blending the third mixture with coffee powder to form a fourth mixture; and spraying the fourth mixture while dry blending with an aqueous carbohydrate solution and agglomerating to provide the composition.

8. A composition as in claim 7 in which the protein component comprises intact whey protein.

9. A composition as in claim 7 wherein the coffee powder is decaffeinated coffee.

10. A composition as in claim 7 wherein the carbohydrate component comprises maltodextrin.

11. A composition as in claim 7 further comprising vitamins and minerals.

12. A composition according to claim 7 wherein the carbohydrate component provides about 40% to about 60% of the calories of the composition.

* * * * *